United States Patent [19]

Leining

[11] Patent Number: 4,592,112

[45] Date of Patent: Jun. 3, 1986

[54] DECLIPPER APPARATUS

[75] Inventor: Lyndon R. Leining, Austin, Minn.

[73] Assignee: Geo. A. Hormel & Co., Austin, Minn.

[21] Appl. No.: 728,510

[22] Filed: Apr. 29, 1985

[51] Int. Cl.$^4$ ............................................ A22C 11/00
[52] U.S. Cl. ........................................ 17/45; 17/1 F; 17/49
[58] Field of Search ...................... 17/1 R, 1 F, 34, 45, 17/49

[56] References Cited

U.S. PATENT DOCUMENTS 4,463,641  8/1984  Sato ................................. 17/1 F X Primary Examiner—Willie G. Abercrombie
Attorney, Agent, or Firm—Herman H. Bains

[57] ABSTRACT

A method and apparatus for removing clips from sausage sticks in preparation for packaging includes a feed mechanism for sequential and indexed movement of the sausage sticks through a plurality of gripping stations. The clipped ends of each sausage stick are pulled outwardly by gripping means at each gripping station to dispose the clipped ends in optimum condition for clamping at a clamping station. The clipped ends of each sausage stick are clamped by clamping mechanisms at the clamping station and the sausage sticks are rotated by gate means to twist the clips from the sausage sticks. The declipped sausage sticks are then moved to a labeling station where labels are mechanically applied to the sticks.

16 Claims, 13 Drawing Figures

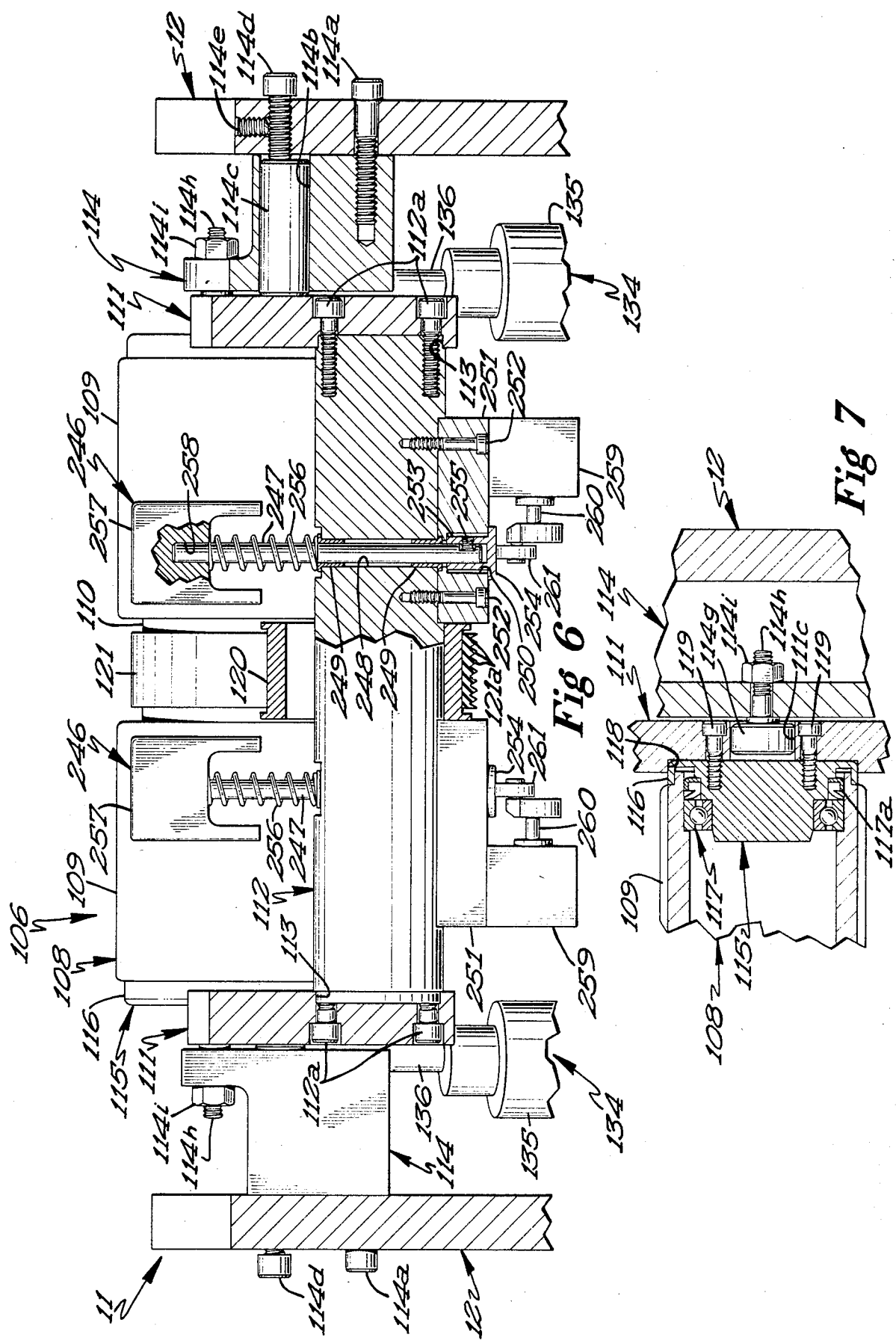

4,592,112

DECLIPPER APPARATUS

This invention relates to an apparatus for removing clips from the ends of an elongate sausage stick.

BACKGROUND OF THE INVENTION

When sausage products are formed, the sausage material is stuffed into a casing and metal clips are applied to the casing at selected intervals to form sausage sticks of predetermined lengths. After the sausage sticks have been completely processed, the metal clips are removed to permit vacuum packaging of the product. If the clips were to remain on the sausage sticks, the plastic wrapping could be punctured in the vacuum packing operation.

Heretofore, the clips have been removed by manually cutting or shearing the clips from the sausage stick. When the clips are removed by cutting or shearing, the ends of the casing are frazzled, thereby resulting in an unattractive package. Furthermore, this manual clip removal operation is labor intensive and is, therefore, very costly.

SUMMARY OF THE INVENTION

It is an object of this invention to provide an apparatus for mechanically twisting the clips from the casing of sausage sticks in preparation for packaging.

It is another object of this invention to provide a novel apparatus which is operable to continuously remove the clips from the ends of the sausage sticks and which is also operable to apply labels to the exterior surface of the sausage sticks.

These and other objects of the invention are defined in the specification.

FIGURES OF THE DRAWING

FIG. 4a is an enlarged fragmentary cross-sectional portion of one of the gripper devices;

FIG. 6 is a cross-sectional view taken approximately along the line 6—6 of FIG. 5 and looking in the direction of the arrows;

FIG. 7 is a cross-sectional view taken approximately along the line 7—7 of FIG. 5a and looking in the direction of the arrows;

FIG. 8 is a cross-sectional view taken along the line 8—8 of FIG. 3 and looking in the direction of the arrows;

FIG. 9 is a cross-sectional view taken approximately along the line 9—9 of FIG. 3 and looking in the direction of the arrows;

FIG. 10 is a cross-sectional view taken approximately along the line 10—10 of FIG. 9 and looking in the direction of the arrows.

DESCRIPTION OF THE PREFERRED EMBODIMENT

Figure 1:
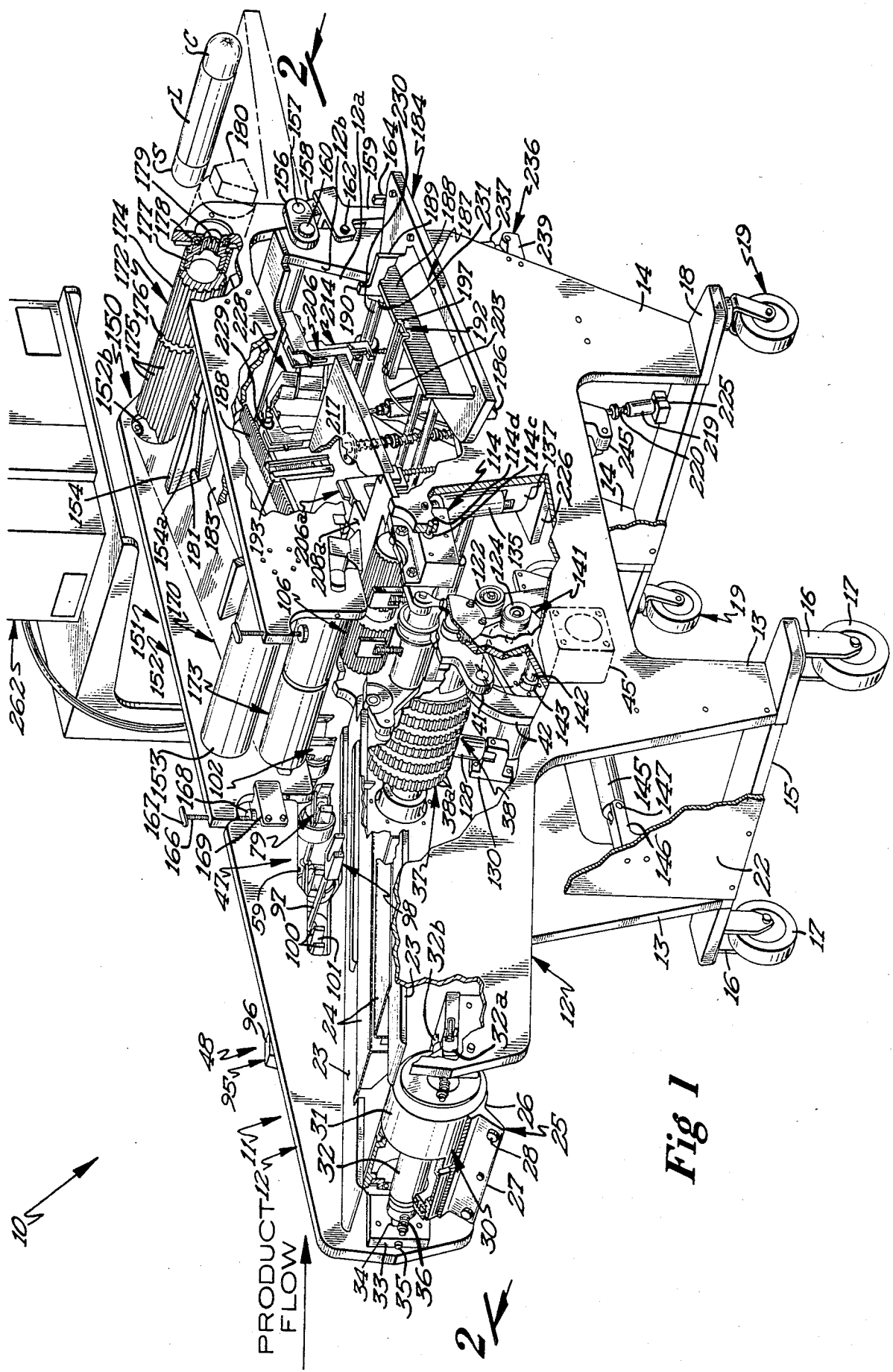
FIG. 1 is a perspective view of the novel clip removing apparatus with certain parts thereof broken away.
Figure 2:
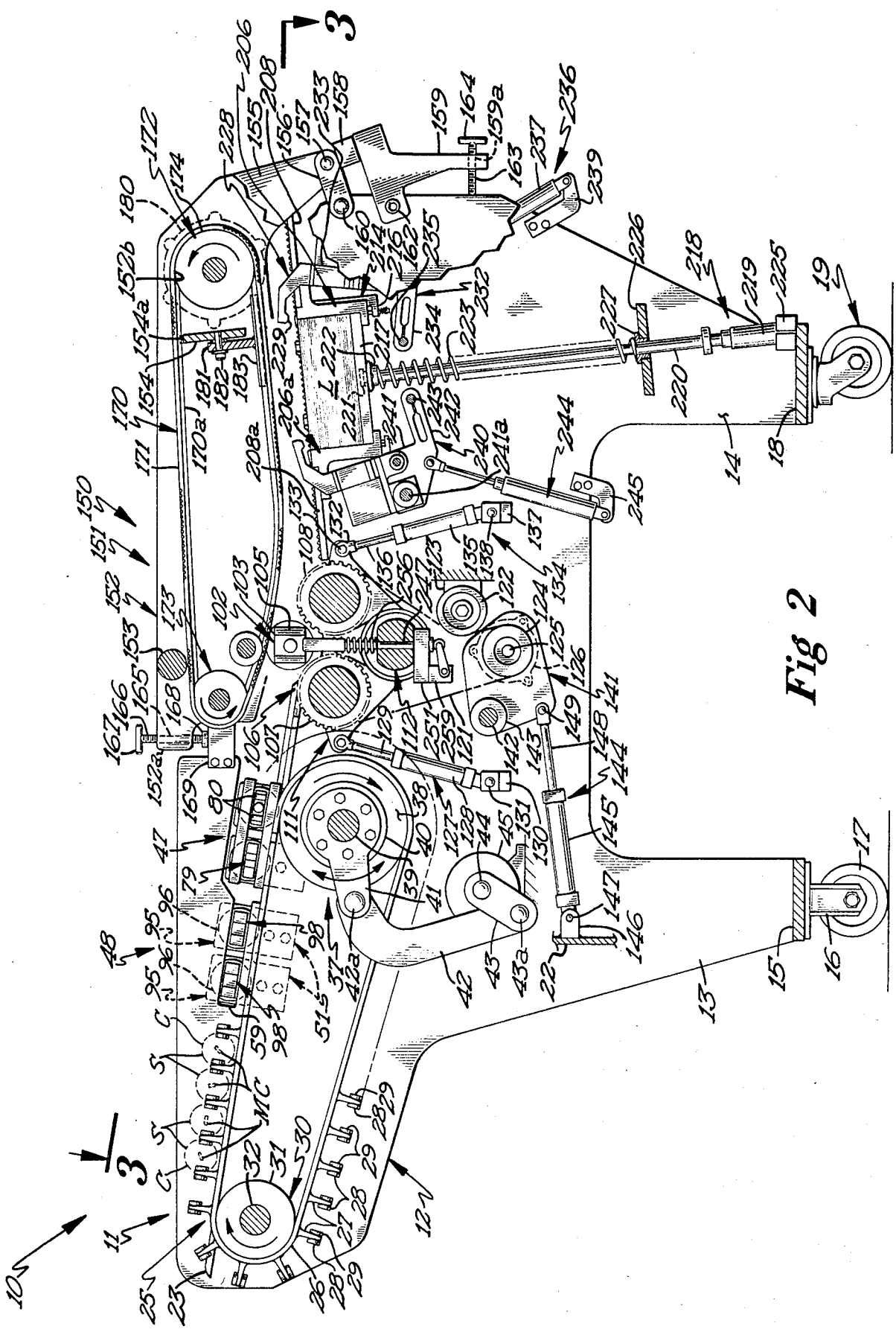
FIG. 2 is a cross-sectional view taken approximately along the line 2—2 of FIG. 1 and looking in the direction of the arrows.

Referring now to the drawings and more specifically to FIGS. 1 and 2, it will be seen that one embodiment of the novel clip removing apparatus, designated generally by the reference numeral 10, is thereshown. The clip removing apparatus includes a support frame 11, which is comprised of a pair of similar vertical side plates 12, each having a front leg 13 and a rear leg 14. The front legs 13 of the side plates 12 are rigidly connected together by a front transverse horizontal plate 15. A pair of wheel brackets 16 are secured to the underside of the transverse horizontal plate 15 and each bracket 16 journals a wheel 17 thereon.

The rear legs 14 of the side plates 12 are rigidly interconnected by a transverse horizontal plate 18. A pair of laterally spaced apart caster wheels 19 are pivotally mounted on the plate 18 to provide a castering action when the clip removing apparatus is moved from one location to another.

The side plates 12 are also rigidly interconnected intermediate their respective ends by transverse tubular frame members (not shown). The front legs of the side plates 12 are also rigidly interconnected by a rear vertical transverse plate 22. A pair of horizontally disposed deck plates 23 are each secured to one of the side plates 12 and project horizontally inwardly from adjacent the inner surface thereof. It will be noted that the inner longitudinal edges of the deck plates are laterally spaced apart with respect to each other. A pair of angle shaped sheet metal belt support members 24, each mounted on one of the deck plates 23, depend therefrom.

Referring again to FIGS. 1 and 2, it will be seen that the clip removing apparatus 10 includes an infeed conveyor device 25, which includes an endless conveyor belt 26 having a plurality of slats or flights 27 integrally formed therewith and projecting outwardly therefrom. The belt and slats are formed of a somewhat yieldable, flexible material, and each slat has a pair of outer positioning elements or buttons 28 affixed to one surface thereof and a central positioning button 29 affixed to the other surface thereof. These buttons serve to engage and position the sausage sticks in a manner to be described more fully hereinbelow.

The infeed conveyor device 25 includes a front takeup roller assembly 30, including a roller cylinder 31 keyed to an elongate shaft 32. The outer ends 32a of the shaft 32 are of rectangular configuration and are shiftably mounted in a pair of shaft mounting blocks 33, each of which is secured to the inner surface of one of the side plates 12. Each shaft mounting block 33 has an elongate horizontal, longitudinally extending takeup slot 34 therein, and these slots accommodate the ends 32a of the shaft 32. A pair of takeup spring mechanisms 36 bias a plastic friction element 32b against the drum 31 to keep it from overrunning drive drum 38 during the drive deceleration phase. A pair of tensioning bolts 35 are each secured to one end 32a of the shaft 32, and each bolt also engages a shaft mounting block 33.

The endless belt 26 is also trained about an indexing roller assembly, which is journaled on the frame downstream of the front takeup roller assembly 30. The indexing roller assembly 37 includes a tooth roller 38, which is comprised of a plurality of axially spaced apart tooth roller elements 38a. The tooth roller 38 is provided with a shaft 39 which is keyed to an indexing clutch mechanism 40. The clutch mechanism 40 has an upper clutch arm 41 secured thereto for movement therewith. The upper clutch arm is connected at one end of a lower clutch arm 42 by a pivot 42a. The lower end portion of the lower clutch arm 42 is pivotally connected at one end thereof to one end of an eccentric arm 43 by a pivot 43a.

The other end of the eccentric arm 43 is mounted on shaft 44 of an indexing drive actuator 45, the latter being mounted on one of the side plates 12. Drive actuator 45 is a Rotac type actuator and is revolvable in both directions. This drive actuator 45 operates the infeed conveyor device 25 in an indexed or interrupted fashion. With this arrangement, the conveyor belt 26 is moved a predetermined length, and then its movement is interrupted for a predetermined period of time and is thereafter moved in the same increment of distance and again interrupted. This indexing permits certain operations to be performed on the sausage sticks to be declipped.

It will be seen that the sausage sticks are positioned upon the inlet conveyor belt 26 between adjacent flights or slats 27 and are arranged transversely of the path of travel of the conveyor belt. The sausage sticks S include an outer casing C which is closed at opposite ends thereof by metal clips MC. The clip removing apparatus removes the metal clips from the casing in preparation for packaging. In the clip removal step, the ends of the casing with the clips attached thereto are gripped by a gripper device and the casing is twisted to permit the clips to be twisted from the ends of the casing. However, sometimes the clipped ends of the casing are pushed inwardly into the ends of the sausage stick and are not in optimum position to be gripped by the gripping devices which grip the clipped ends during the twisting operation.

Therefore, means are provided for gently pulling the clipped end portions of the casing outwardly prior to the final twisting operation. This means includes a first pair of identical gripper devices 46 mounted on one of the side plates 12 intermediate the ends thereof and a second pair of substantially identical gripper devices 47 mounted on the other side plate 12 and downstream of the first pair of gripper devices. A first pair of substantially identical pusher devices 48 are each mounted in opposed relation to one of the first pair of gripper devices 46 on one of the side plates 12, and a second pair of substantially identical pusher devices 49 are each mounted oppositely of one of the second pair of gripper devices. Each of the pusher devices serves to engage one end of a sausage stick to push the sausage stick towards the oppositely located gripper device.

Figure 4:
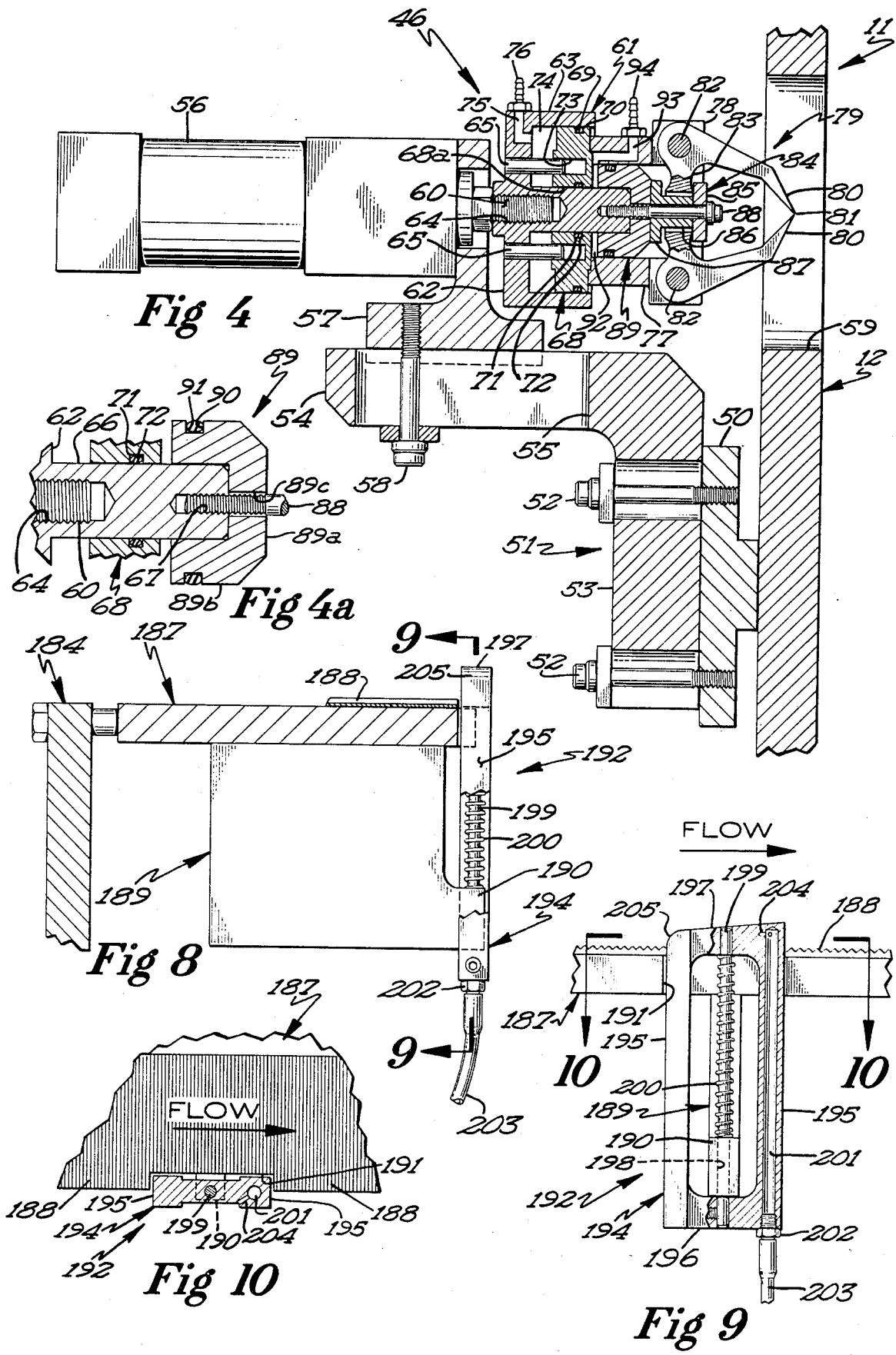
FIG. 4 is a cross-sectional view taken approximately along the line 4—4 of FIG. 3 and looking in the direction of the arrows, with the jaw section shown rotated 90 degrees from actual use position for clarity.
Figure 5:
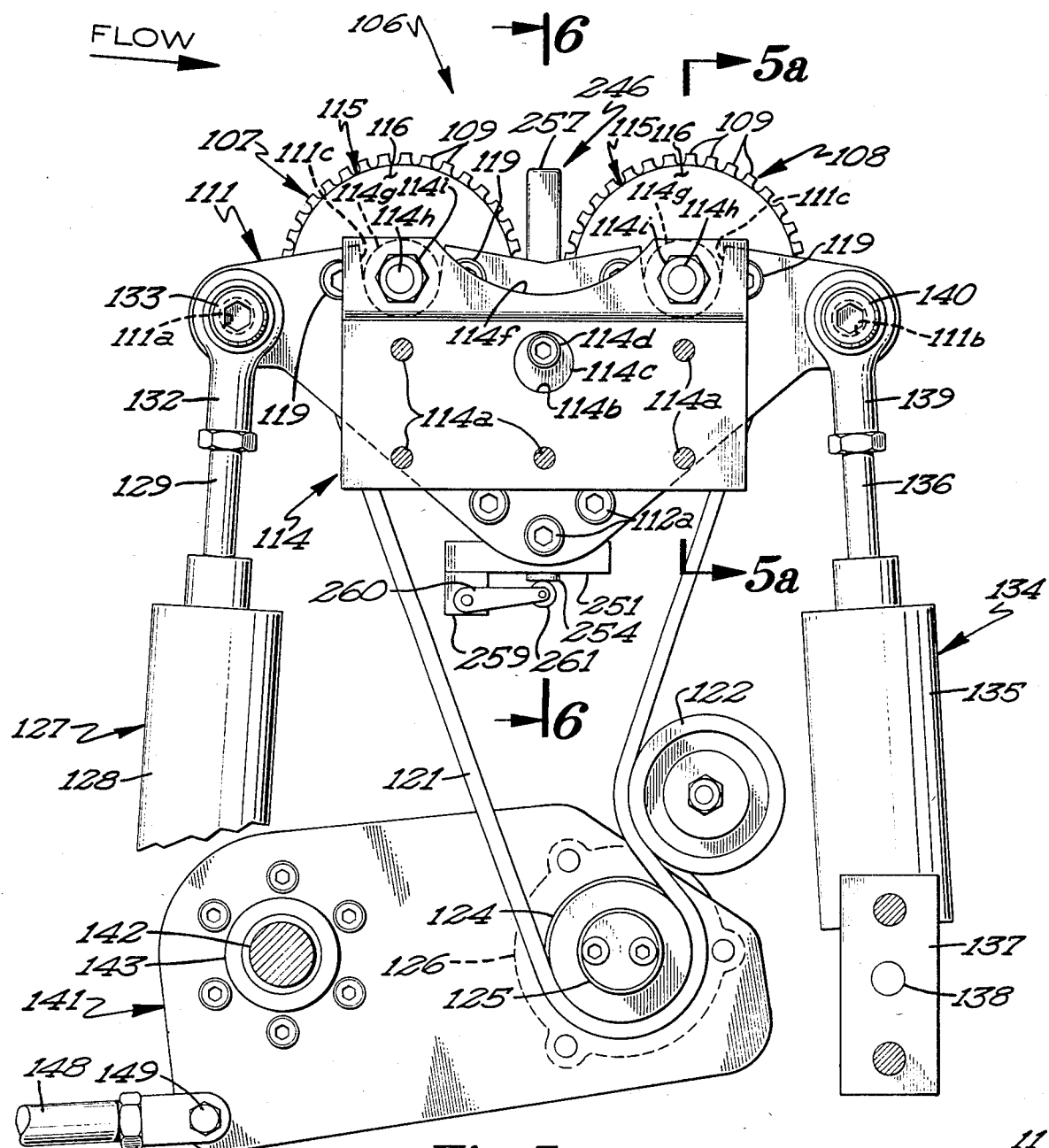
FIG. 5 is a cross-sectional view taken approximately along the line 5—5 of FIG. 3 and looking in the direction of the arrows.
Figure 5A:
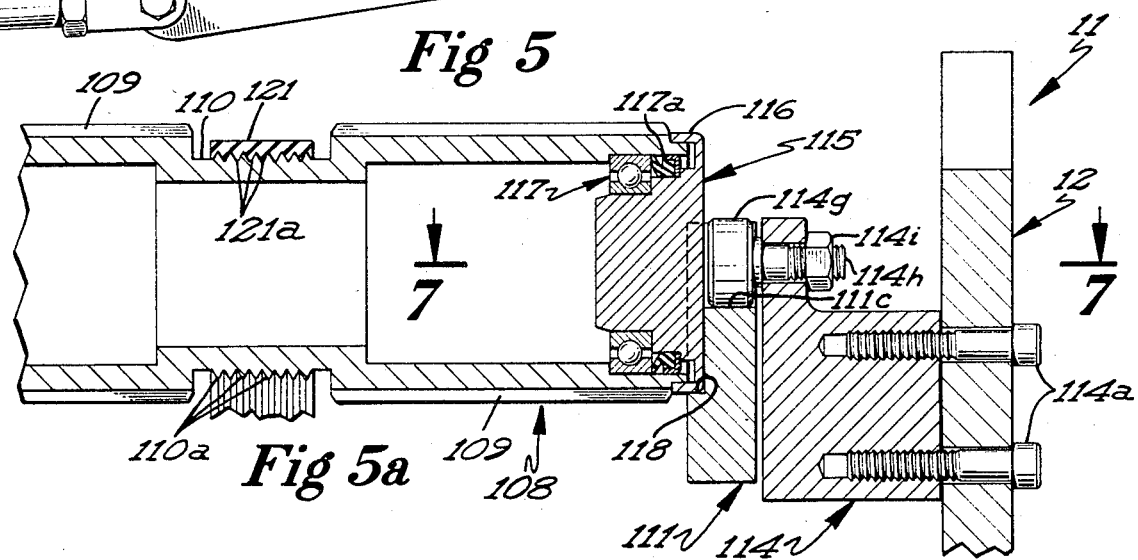
FIG. 5a is a cross-sectional view taken approximately along the line 5a—5a of FIG. 5 and looking in the direction of the arrows.
Figure 11:
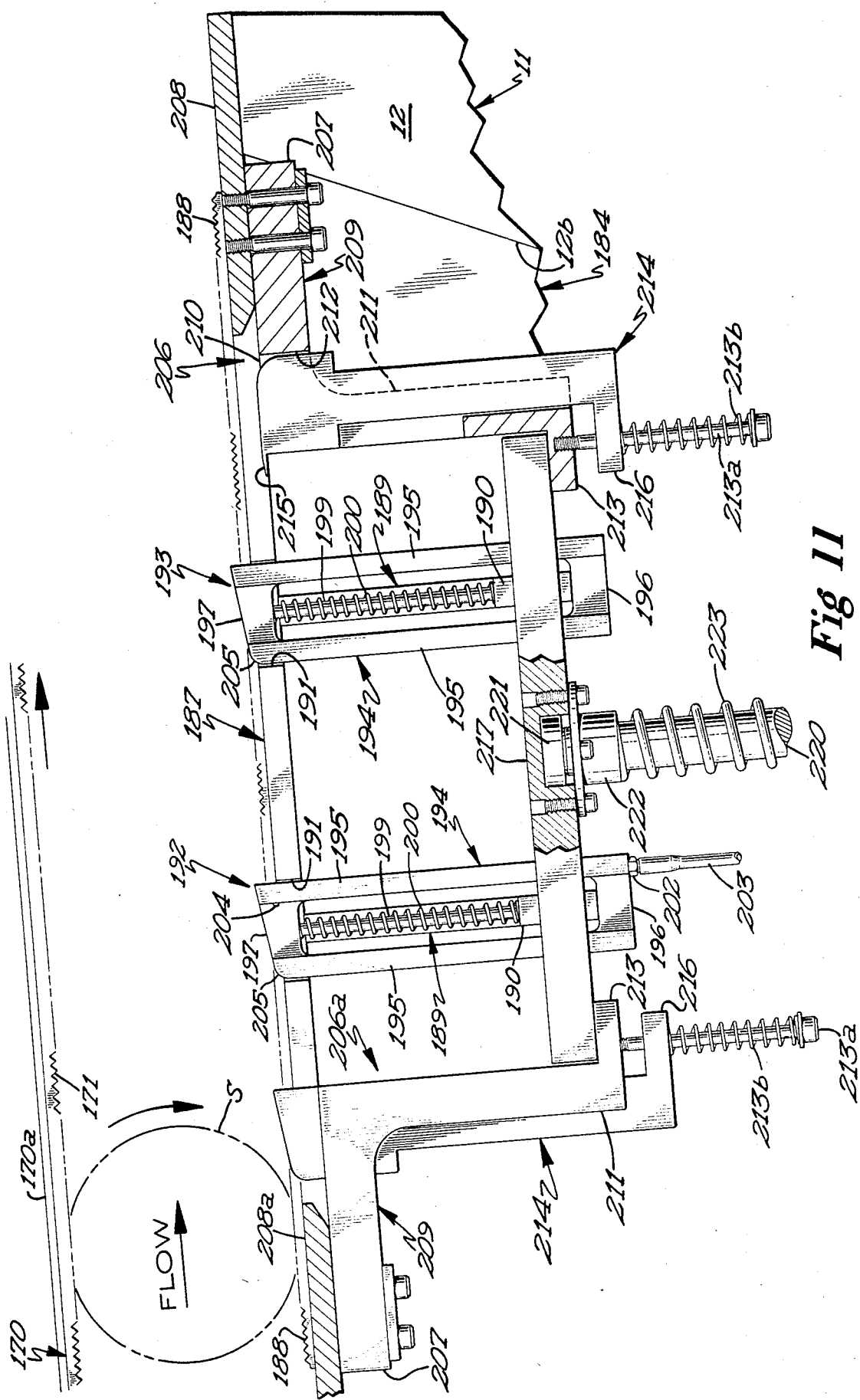
FIG. 11 is a cross-sectional view taken approximately along the line 11—11 of FIG. 3 and looking in the direction of the arrows.

Referring now to FIGS. 4 and 4a, it will be seen that the details of construction of one of the gripper devices is thereshown. It is pointed out that, since all of the gripper devices are of identical construction, it is only necessary to describe the construction of one of the gripper devices. It is further pointed out that the particular manner in which each gripper device and each pusher device is mounted is substantially identical, with the exception that one group is located on one side plate and the other group is located on the other side plate.

Referring again to FIG. 4, it will be seen that each side plate 12 is provided with an elongated, horizontal, longitudinally extending rail 50 which is rigidly secured thereto. Each rail has mounted thereon a plurality of L-shaped brackets 51 mounted thereon by suitable nut and bolt assemblies 52. Each L-shaped bracket 51 either mounts a gripper device or one of the pusher devices. Each L-shaped bracket 51 includes a vertical arm 53 and a horizontal arm 54, which projects laterally outwardly from adjacent the associated vertical side plate 12. The horizontal arm 54 is provided with an elongate vertical slot 55 therein. Each gripper device includes a pneumatic cylinder 56, which is secured to a bracket 57, the latter being secured to the associated L-shaped bracket 51 by a nut and bolt assembly 58. In the embodiment shown, the nut and bolt assembly 58 extends through the slot 55 in the horizontal arm of the associated L-shaped bracket and engages the bracket 57 to permit adjustment of the associated gripper device in a lateral direction relative to the associated side plate. In this regard, it will be noted that each side plate has an elongate longitudinally extending slot 59 therein through which one pair of gripper devices and one pair of pusher devices project. The slots in the associated L-shaped brackets permit adjustment on the gripper devices and pusher devices relative to the side plates to accommodate various size sausage sticks.

Referring again to FIG. 4, it will be seen that each gripper device also includes a piston rod 60, which is affixed to a piston movable in the double acting pneumatic cylinder 56. It will be noted that the piston rod is threaded and engages a cylindrically shaped cup 61 for shifting the latter in an axially extended and axially retracted direction. The cylindrical cup 61 of each gripper device includes an end wall 62 and an annular wall 63. The end wall has a threaded bore 64 therethrough which threadedly engages the threaded piston rod 60.

The end wall 62 has a pair of openings therein which accommodate a pair of elongate guide pins 65 that are press fitted therein. It will be noted that the guide pins project axially from the associated end wall. The end wall 62 also has a centrally located axially extending stem 66 projecting therefrom and the stem 66 has an outwardly opening threaded axial bore 67 therein. It will be noted that the axial bore 67 has a lesser diameter than the axial bore 64 in the end wall 62.

A circular free floating piston 68 having an axial opening 68a therethrough is positioned upon the stem 66 for axial movement relative thereto. The free floating piston 68 has an annular groove 69 in the outer circumferential edge thereof which accommodates an O-ring 70 therein. The O-ring 70 sealingly engages the inner annular wall surface of the cylindrical cup 61 to form a seal thereat. The piston 68 also has an annular groove 69 in the inner circumferential surface defining the opening 68a therein and this groove 71 also accommodates an O-ring 72 therein for sealingly engaging the exterior surface of the stem 66.

The free floating piston 68 is provided with a pair of openings 73 therein for accommodating the guide pins 65. It will be seen that the free floating piston 68 cooperates with the cylindrical cup 61 to define a pneumatic chamber 74. The end wall 62 has a port 75 therein which communicates with a fitting 76, which is connected to a source of air under pressure by a conventional conduit. It will be seen that when air is introduced through the port 75 and into the chamber 74, the free floating piston 68 will be moved axially away from the end wall 62 of the cylindrical cup 61.

An annular collar 77 is rigidly affixed to the free floating piston 68 and projects axially therefrom. The collar 77 has a pair of spaced apart mounting flanges integrally formed therewith and projecting axially therefrom. A pair of clamping jaws 79 are pivotally mounted between the mounting flanges 78, and each jaw includes front end portions 80 that project towards the other jaw and terminates in a clamping edge 81. The jaws are each pivotally mounted on the mounting flanges 78 by pivots 82, which extend through openings in the jaws. Each jaw has an inwardly projecting arm 83 which projects inwardly towards the arm 83 on the other jaw. It will be seen that, when the jaws are pivoted in one direction, the front end portions thereof are swung outwardly towards each other and when the jaws are pivoted in the opposite directions, the front end portions are swung towards each other so that the clamping edges 81 engage each other.

Means are provided for shifting the jaws between open and closed positions, and this means includes a spool mechanism 84 which is comprised of a front end annular element 84a. A sleeve element 86 having an apertured flange 87 integrally formed therewith is secured to the stem 66 by a bolt 88 that threadedly engages in the threaded bore 67 in the outer end of the stem. The bolt 88 passes through the annular element 84 and the sleeve 86 to clamp the spool mechanism to the stem.

A cup-shaped member 89 having an end wall 89a and an annular wall 89b is positioned interiorly of the collar 77. The end wall 89a has an opening 89c therethrough for accommodating the bolt 88. The annular wall 89b has annular groove 90 therein for accommodating an O-ring 91. The O-ring engages the inner surface of the collar 77 to form a seal thereat. The cup member 89 cooperates with the collar 77 and the free floating piston 68 to define a pneumatic chamber 92. The pneumatic chamber 92 is connected by a port 93 with a fitting 94. The fitting 94 is connected by a suitable conduit to a source of air under pressure. It will be seen that, when air under pressure is introduced into the chamber 92, the free floating piston 68 will be moved axially towards the end wall 62. Conversely, when air under pressure is introduced through the chamber 74, the free floating piston will be moved axially away from the end wall.

It will be seen that, when the free floating piston 68 is moved axially away from the end wall 62, this movement will also cause the collar 77 to be shifted axially outwardly so that the inwardly projecting arms 83 of the jaws will be actuated by the spool mechanism to close the jaws 79. Conversely, when the free floating piston 68 is shifted in the opposite direction towards the end wall 62, the arms 83 of each jaw will coact with the spool mechanism to produce opening movement of the jaws. It will also be appreciated that the entire gripping mechanism may be shifted axially inwardly and outwardly by extending and retracting the piston rod 60 relative to the pneumatic cylinder 86. Movement of the piston rod is, of course, independent of the movement of the free floating piston 68. Therefore, the jaws may be shifted axially inwardly and outwardly relative to the cylinder 56 in either the open or closed positions. It is pointed out that all of the gripper mechanisms are constructed in the aforementioned manner and all operate in the identical manner. It is further pointed out that each gripper mechanism operates simultaneously relative to the operation of every other gripper mechanism.

Referring again to FIG. 3, it will be seen that each of the pusher devices 48 includes a pneumatic double acting cylinder 96 mounted on an associated L-shaped bracket (not shown). Each cylinder is provided with a piston to which an elongate piston rod 97 is affixed. The piston rod 97 is extensible and retractible relative to the cylinder 96. The outer end portion of each piston rod is provided with a U-shaped sausage engaging yoke 98 including a web portion 99 having a pair of fingers 100 projecting therefrom. The fingers 100 are spaced apart to define a recess 101 therebetween. When the piston rod 97 is extended, the U-shaped yoke will engage the end of a sausage stick so that the clip MC is positioned in the recess 101. The piston rod 97, when extended, will urge a sausage stick transversely of the feed conveyor so that the other end of the sausage stick is moved towards one of the gripper devices 46.

Referring again to FIG. 3, it will be seen that the clip removing apparatus also includes a pair of gripping and twisting devices 102 which are mounted in opposed relation with respect to each other and are located downstream of the second pair of gripper devices. The gripping and twisting devices 102 are of identical construction and are also substantially identical to the gripper devices 46 and 47. The only difference in the gripping and twisting devices 102 and the gripper devices 46, 47 is the particular construction of the jaws. The jaws 103 of the gripping and twisting devices include front end portions 104 which angle inwardly towards each other in the manner of the jaws of the gripper devices and which terminate in rounded gripping surfaces 105, rather than the more pointed gripping edges of the jaws of the gripper devices. In the embodiment shown, the twisting and gripper devices are mounted on L-shaped brackets (not shown) which are secured to the side plates 12 in the same manner as the gripper devices 46, 47. It will also be noted that the gripping and twisting devices 102 also project through the slots 59 and the side plates in the manner of the gripper devices. The gripping and twisting devices are also adapted to be simultaneously extended by their respective piston rods and to have their jaws actuated to the open and closed position simultaneously with respect to each other.

The declipper apparatus also includes a gate roller assembly 106 which is comprised of a rear roller 107 and a front roller 108, each of which is of identical construction and each being disposed transversely of the path of travel of the sausage sticks to be declipped. Referring now to FIGS. 5, 5a, 6, and 7, it will be seen that each roller of the gate roller assembly is provided with axially extending circumferentially spaced apart teeth 109 therein to facilitate gripping of the sausage stick during the clip removing operation. Each of the rollers also has a central recess 110 therein, the recess portion having axially spaced apart circumferentially extending teeth 110a therein.

The rollers of the gate roller assembly are revolvably mounted on a pair of substantially identical triangular side plates 111 which are rigidly connected together by a transverse cylindrical member 112. It will be noted that each of the triangular plates 111 has a circular recess 113 in the inner surface thereof adjacent the apex for accommodating the end portions of the transverse member 112. Suitable bolts 112a suitably secure the triangular plates and transverse member together.

Each gate roller has opposite ends thereof journaled on a pair of stub shafts 115, each stub shaft having a radial flange 116 integrally formed therewith projecting outwardly therefrom. In the embodiment shown, a bearing unit 117 is interposed between one end of each roller and the associated stub shaft to permit rotation of each roller relative to the stub shaft. The flange 116 of each stub shaft is positioned in one of a pair of semi-circular recesses 118 in each triangular side plate. Suitable bolts 119 secure the flange of each stub shaft to the associated side plate. With this arrangement, it will be seen that the front and rear rollers are mounted in side-by-side relation for rotation relative to the supporting triangular side plates.

Referring again to FIGS. 5 and 6, it will be seen that transverse member 112 has an idler pulley 120 positioned thereon. A drive belt 121 is trained about and engages the teeth on the reduced recess 110 of each roller, and is trained about the idler pulley 120 on the transverse member 112. In this regard, it will be noted that the drive belt is looped downwardly around the idler pulley 120 and extends upwardly therefrom and is trained over each of the rollers of the gate roller assembly. It will also be noted that the lower surface of the drive belt 121 is provided with circumferentially extending axially spaced apart ribs 121a which interdigitate with the ribs 110a on the front and rear rollers. The drive belt is trained downwardly around an idler pulley 122 which is mounted on a bracket 123 secured to one of the side plates 112. The belt is thereafter trained around the drive pulley 124 mounted on the output shaft 125 of a hydraulic motor 126. It will be apparent that, when the hydraulic motor 126 is energized, the front and rear rollers of the gate roller assembly will be revolved.

Means are provided for shiftably mounting the gate roller assembly 106 for movement relative to the frame to permit raising and lowering of the front and rear rollers. This means includes a rear pair of pneumatic piston and cylinder units 127, each including a pneumatic cylinder 128 having a piston rod 129 movable therein. Each rear cylinder 128 is mounted on the bracket 130 by a bolt 131. The brackets 130 are mounted on the side plates 12. Each piston rod for the rear piston and cylinder is provided with a connector element 132 which is secured to a pivot bolt 133. Each pivot bolt 133 is journaled in an opening 111a in one of the triangular side plates 111.

A front pair of cylinder and piston units 134 is also provided, and each includes a pneumatic cylinder 135 having a piston rod 136 movable relative thereto. Each front cylinder 135 is mounted on a bracket 137 by a bolt 138, each bracket being secured to one of the side plates 12. The piston rod of each front cylinder and piston unit is also provided with a connector element 139 which is secured to a pivot bolt 140 journaled in an opening 111b in one of the triangular side plates 111.

Each triangular plate 111 has a pair of upwardly opening curved recesses 111c in the upper edge thereof. A pair of cam support blocks 114 are each attached to one of the side plates 12 by bolts 114a. Each cam support block 114 has an opening 114b therethrough for receiving a plastic bearing element 114c which engages one of the triangular plates 111. A bolt 114d retains the plastic element 114c in bearing contact with the associated triangular plate 111. A set screw 114e prevents accidental loosening of the bolt 114d.

Each cam support block 114 has an arcuate recess 114f in the upper surface thereof. Each block is also provided with a pair of circular cam followers 114g which are provided with threaded shanks 114h and secured to the associated block by nut 114i. Each cam follower 114g is positioned in one of the recesses 111c of the associated triangular plate.

With this arrangement, it will be seen that, when the front pair of cylinder and piston units 134 are extended, the front roller 108 will be raised relative to the rear roller 107. The triangular plates will pivot about one of the cam followers 114g. Conversely, when the rear pair of piston and cylinder units are extended, the rear roller will be raised relative to the front roller. A detailed discussion of the particular manner in which the gate roller assembly functions will be discussed more fully hereinbelow.

Referring to FIGS. 1 and 2, it will be seen that the hydraulic motor 126, which drives the drive belt 121 for the gate rollers, is mounted on a mounting plate 141. The mounting plate 141 is pivoted on a shaft 142 by a bearing 143 to permit pivoting of the mounting plate about an axis defined by the pivot shaft 30. In the embodiment shown, the mounting plate is rigidly affixed to the bearing which is journaled on the shaft 142.

Means are provided for pivoting the mounting plate and hydraulic motor 126 mounted thereon, and this means includes a cylinder and piston unit 144. The cylinder and piston unit 144 includes a cylinder 145 which is pivotally connected to a bracket 146 by a pivot pin 147. The bracket 146 is secured by suitable bolts to the rear vertical transverse plate 22. This piston rod 148 is pivotally connected by a pivot pin 149 to the mounting plate 141. Air is supplied by means of a regulator to the rod end of cylinder 144 so that the motor follows the gate rolls in an up and down motion. Belt tension is, therefore, a function of the air pressure. This assures that the drive belt 121 will be maintained in a taut condition.

Referring again to FIGS. 1 to 3, it will be seen that the declipper apparatus also includes an outfeed and labeling conveyor device 150 which includes a rigid support frame 151. The support frame 151 includes a pair of substantially identical side plates 152 which are rigidly interconnected adjacent one end by a transverse cylindrical frame member 153, and the side plates are connected adjacent the other end thereof by a transverse plate member 154. The front end portions of the side plates 152 define downwardly extending leg members 155. The lower end portions of the leg members 155 are pivotally connected to the side plates 12 of the support frame 11.

The means for pivotally connecting the leg members 155 to the side plates 112 include a pair of links 156, each pivotally connecting one of the leg members 155 to a pivot block 158 by a pivot 157. The pivot block 158 is secured to the upper end of a generally vertically disposed crank arm 159. Each link 156 is also pivotally connected by a pivot 160 to an upturned extension 161 of the associated side plate 12. Each crank arm 159 is also pivotally connected to the associated upturned extension 161 by a pivot 162. Each crank arm 159 is provided with an elongate actuator screw 163 which threadedly engages in the threaded recess 159a in the crank arm, and each actuator screw is provided with a handle 164 to facilitate the rotation thereof.

Each side plate 152 of the support frame 151 is provided with a longitudinally rearwardly extending projection 152a at the rear end portion thereof. Each rear end projection 152a is provided with a threaded vertical opening 165 therethrough for threadedly engaging an adjusting screw 166 therein. Each adjusting screw 166 has a handle 167 affixed to its upper end to facilitate turning thereof. The lower end portion of each adjusting screw is provided with a pad 168 which engages a support block 169 affixed to the associated side plate 12. With this arrangement, it will be seen that when the adjusting screws 166 are rotated, the front end portion of the support frame 151 will be either raised or lowered, thereby causing pivoting movement of the support frame about the pivot 157. The entire rear end portion of the support frame 151 may be raised or lowered by adjusting the actuator screw 163.

An elongate endless conveyor belt 170 having transverse teeth 171 therein is trained about a rear drive roller 172 and a front idler roller 173. Both of these rollers are of substantially identical construction and it is deemed necessary to describe only one of them for the purpose of this Application. The rear drive roller 172 includes an elongate roller cylinder 174 having circumferentially spaced axially extending teeth 175 therein and the roller cylinder is provided with a central annular recess 176. In this regard, the conveyor belt 170 is provided with a depending annular guide element 170a which engages in the central annular recess in each of the rollers.

The end portions of the roller cylinder are provided with a bearing race 177, which is press fitted therein and which is journaled in a bearing race 178 positioned in a circular recess 152b in each of the side plates 152 of the support frame 151. Thus, the rear drive rollers are journaled on the support frame 151 for rotation relative thereto.

The bearing race 177 at one end of the rear drive roller 172 is provided with a splined cylindrical recess 179 which is engaged by the splined output shaft of a hydraulic motor 180. Hydraulic motor 180 is mounted on one of the side plates 152 and, when energized, will drive the conveyor belt 170 so that the lower run thereof is moved in a rearward direction. It will be seen that transverse plate member 154 has a generally triangular shaped mounting member 181 pivotally connected thereto by centrally located pivot 182 to permit the mounting member 181 to swing vertically about a horizontal longitudinal axis. It will also be noted that the transverse plate member 154 has a central recess 154a therein to permit passage of the guide element 170a on the conveyor belt 170. The mounting member 171 has a pair of substantially flat generally rectangular shaped laterally spaced apart plastic shoes 183 secured to the lower surface thereof for movement therewith. The plastic shoes engage the upper surface of the lower run of the conveyor belt 170 to insure effective contact of the conveyor belt with the sausage sticks as they are moved by the conveyor belt in a manner to be more fully described hereinbelow.

Referring again to FIGS. 1 and 2, it will be seen that each of the side plates 12 has an opening 12a therein adjacent the front end thereof. A pair of substantially identical flat elongate door plates 184 are each hingedly connected to the upper edge 12b of one of the side plates 112 by hinges 185 for vertical swinging movement relative thereto between open and closed positions. One of the door plates 184 is illustrated in the open position in FIG. 2. However, when the door plates are in the closed position, each door plate is vertically disposed and forms a continuation of the associated side plate 12. The exterior surface of each side plate 12 is provided with a pair of outwardly projecting stop members 186, each having a substantially flat upper surface 186a against which the associated door plate 184 engages when the latter is in the open position. It will be noted that these door plates are supported in a substantially horizontal position when in the open condition.

Each door plate 184 has a substantially flat elongate, generally rectangular shaped support plate 187 affixed to the inner surface thereof by suitable bolts 187a, as seen in FIGS. 1 and 2. It will be noted that these support plates 187 are disposed in substantially right angular relationship with the associated door plate so that the support plates are disposed horizontally when the door plate is in the closed condition. These support plates support the sausage sticks S after the latter have been declipped and during movement thereof by the outfeed and labeling conveyor device. It will be noted that each support plate has a plurality of longitudinally spaced apart transverse teeth 188 formed on the upper surface thereof to facilitate effective gripping contact of the sausage sticks as the sausage sticks are moved by the outfeed conveyor belt 170.

Referring to FIGS. 8, 9, and 10, it will be seen that each of the support plates 187 has a pair of generally rectangular shaped flat cam support blocks 189 affixed thereto. It will be noted that the cam support blocks 189 of each support plate are longitudinally spaced apart and each is rigidly affixed to the lower surface of the associated support plate by suitable bolts. Each cam support block 189 has a small rectangular projection 190 projecting outwardly therefrom. Each support plate 187 also has a pair of longitudinally spaced apart notches or recesses 191 in the inner longitudinal edge thereof.

The front cam support block 189 on each support plate supports a front side label aligner 192, while the rear cam support block on each support plate 187 supports a rear side label aligner 193. Each rear side label aligner is disposed in opposed relation with a corresponding side label aligner on the other support plate. Similarly, each front and side label aligner on one support plate is disposed in an opposed relation to the front side label aligner on the other support plate. It will also be noted that each side label aligner is positioned in one of the notches 191 in each support plate.

Each of the front and rear pairs of side label aligners are of substantially identical construction, and each comprises a generally rectangular shaped frame 194 including longitudinal frame members 195, which are interconnected by a lower transverse frame element 196 and an upper transverse frame element 197. Each cam support block 189 has a recess in the upper surface of the projection 190 thereof which receives the lower end portion of the rod 199 therein. The upper end portion of the rod 199 projects into a recess in the upper transverse frame element 197 on the associated rectangular frame 194 and a helical spring 200 is positioned around the rod 199. It will be noted that the spring for each rectangular frame 194 engages the lower surface of the upper transverse frame element 197 and engages the upper surface of the projection 190. The spring 200 serves to resist downward movement of the associated frame element 194.

Each of the front pair of side label aligners 192 has an elongate passage 201 in one of the longitudinal frame elements 195 thereof and the lower end of each passage is connected in communicating relation to a fitting 202. The fitting 202 is connected by a suitable conduit 203 to a source of air under pressure. The upper end of each passage 201 terminates in outlet port 204 formed in the upper transverse frame element 197. Air under pressure will be emitted through the outlet port 204. It will also be noted that the rear upper corner portion 205 of each of the front and rear pairs of side label aligners is rounded, and this serves as a cam surface, which is engaged by the sausage sticks as they are rolled along the support plates 187.

A rear pair of laterally spaced apart end label aligners 206 are provided and each serves to engage the rear end edges of the labels mounted on the declipper apparatus for maintaining the labels in an aligned condition. A pair of clamping plates 207 is provided, each serving to clamp one of the front end label aligners 206 to the lower surface of a substantially flat transversely extending discharge plate 208. A front pair of laterally spaced apart end label aligners 206a are also provided and each is mounted on transverse horizontal plate 208a located upstream from the rear end label aligners. Each end label aligner is of identical construction.

It will be seen that each end label aligner 206 is comprised of an L-shaped stationary member 209 which is comprised of a pair of spaced apart horizontal elements 210 and a pair of vertical elements 211 integrally formed with the horizontal elements 210. It will be noted that the front end portions of the horizontal elements are rigidly connected together and the lower end portions of the vertical elements are rigidly affixed together to thereby define an opening 212 between the horizontal and vertical elements comprising each L-shaped stationary member. The lower end portion of the joined vertical elements 211 have a horizontal support element 213 integrally formed therewith and projecting therefrom. It will be noted that this support element 213 on the front end label aligner projects rearwardly, while the support element 213 on the rear end label aligner projects forwardly.

Each end label aligner 206 also includes a vertically movable hold down member 214, which is positioned between the horizontal and vertical elements of each L-shaped stationary member for vertical movement relative thereto. Each hold down member 214 also is provided with an upper finger 215 which projects horizontally therefrom and a lower finger 216 which projects horizontally therefrom.

The labels to be applied to the sausage sticks are supported upon a label support plate 217 which is horizontally disposed and which is of generally rectangular configuration. The label support plate 217 is vertically movable, and in its lowermost position is supported upon the horizontally extending support elements 213 of the end label aligners. However, means are provided for urging the label support plate upwardly as the labels are progressively removed from the plate, so that the uppermost label will be in a position to be engaged by each succeeding sausage stick S.

This means includes a cylinder and piston unit 218 which comprises a cylinder 219 having a piston rod 220 extensible and retractible relative thereto. The upper end portion of the piston rod engages a urethane disc 221 positioned in a socket in the lower surface of the label support plate 217. Suitable helical springs 223 are positioned around the piston rod with adjacent ends of the springs engaging conventional collars 224. The upper end of the uppermost spring 223 engages the lower surface of the label support plate 217.

The cylinder 219 is secured to a bracket 225 which is affixed to the horizontal transverse member 18. It will also be noted that the piston rod 220 passes through an opening in a transverse plate 226 which extends between and is rigidly secured to the rear legs 14. The plate 226 has an opening therethrough which accommodates a guide collar 227 through which the piston rod 220 projects. It will be seen that the stack of labels L will be positioned upon the label support plate 217 so that the unprinted side of the labels is disposed upwardly.

It is necessary to apply glue successively to each upper label surface so that the label will adhere to the exterior surface of the sausage stick as the latter is rolled over the label. This means includes a rear glue head assembly 228 which is only partially shown and which is shiftably mounted on a pivot rod 235. The rear glue head assembly 228 has a discharge outlet 229 through which the glue is discharged. The glue head is slidably mounted on a tubular member (not shown) which has opposite ends thereof secured to mounting blocks which are attached to the inner surfaces of the side plates 12. The tubular member on which the glue head is slidably mounted comprises a magnetic cylinder which permits lateral sliding movement of the glue head in opposite directions. Each bell crank 232 includes an arm which is secured to the glue head and an arm 234 which is pivotally connected to the pivot 235.

Means are provided for pivoting the bell cranks 232 for the rear glue head assembly 228, and this means includes a pair of cylinder and piston units 236. Each cylinder and piston unit 236 includes a cylinder 237 having a piston rod which is pivotally connected to the bell crank. The cylinder 237 for each cylinder and piston unit 236 is mounted on a bracket 239 secured to the associated side wall 12. It will be seen that, when the piston rod for each cylinder and piston unit 236 is extended, the bell cranks 232 will be pivoted about their respective pivots 235 to shift the rear glue head assembly 228 to a position so that the discharge outlet 229 overlies the labels stacked on the label support plate 217. When the glue head is shifted laterally, glue discharged from the rear glue head assembly will cover a portion of each label as they are successively applied to the sausage sticks.

The apparatus is also provided with a front glue head assembly which is mounted on a pair of front bell cranks 240, each including an arm 241 and an arm 242. The arm 241 is slidably mounted on tubular member 240a having a magnetic slug 240b therein. Air under pressure shifts the magnetic slug in either direction so that the glue head is slidable when in the operative position. The arm 242 is connected by a pivot 243 to the associated side plate. A pair of cylinder and piston units 244 are each mounted on a bracket 245 secured to the transverse plate 226. The piston rod of the cylinder and piston unit 244 is connected to the arm 242 of each rear bell crank 240 so that, when the piston rod is extended, the front glue head assembly will be moved to an operative position overlying the labels.

Referring again to FIGS. 5 and 6, it will be seen that means are provided by actuating operation of the gripping and twisting devices, as well as the gate roller assembly. These actuators are designated generally by the reference numeral 246 and are laterally spaced apart and are positioned between the front and rear rollers of the gate roller assembly. Each actuator includes a vertical rod 247 which projects through one of a pair of openings 248 in the transverse member 112 and which thereafter projects upwardly between the front and rear rollers of the gate roller assembly.

Each opening 248 in the transverse member has a pair of bushings 249 positioned therein to facilitate vertical shifting movement of the associated rod 247. Each rod 247 also projects through an enlarged opening 250 in one of a pair of mounting blocks 251, each of which is secured to the lower surface of the transverse member 112 by suitable bolts 252. Each rod 247 is provided with a sleeve element 253 at its lower end, and each sleeve element 253 has an end cap flange 254 closing the lower end thereof. Each sleeve element 253 is secured to its associated rod by a set screw 255 which projects through an opening in the sleeve element and into a recess in the associated rod.

Each rod has a helical spring 256 positioned around the upper portion thereof and each rod projects into a recess 258 in one of the pair of sausage engaging elements 257. It will be seen that the sausage engaging elements 257 are positioned between the front and rear rollers of the gate roller assembly in a position to be engaged by a sausage stick when the latter is moved over the rollers.

Each mounting plate 251 has a control switch mechanism 259 mounted thereon, which is provided with a switch arm 260. The switch arm 260 has an upwardly projecting actuator element 261 which is disposed in contacting relation with the end cap flange 254 mounted on the associated rod. With this arrangement, it will be seen that, when a sausage stick engages the sausage engaging elements 254, both of the rods will be depressed and thereby will depress the actuator element 261 to operate the control switch mechanism 259. This initiates the operation of the gate roller assembly and also controls operation of at least a portion of the cycle of the gripping and twisting devices 102.

During operation of the clip removing apparatus 10, the sausage sticks S to be declipped are placed on the infeed indexing conveyor device 25. In this regard, the sausage sticks S are positioned between flights or slats on the endless belt 26 and the sausage sticks are moved in index fashion through a first station where movement of the endless belt is interrupted. In this regard, it is pointed out that the entire operation of the various power components of the clip removing apparatus are controlled by a computer-type controller 262.

At the first station, the ends of the sausage sticks will be generally aligned between one of the first pair of pusher devices and one of the first pair of gripper devices. The pusher device will be actuated so that the U-shaped yoke 98 engages the end of the sausage stick and will push the sausage stick towards the opposed gripper device. Movement of the first pusher device is produced by extension of the piston rod 97 of the pneumatic double acting cylinder 96. Fingers 100 of the pusher device will engage the sausage stick on opposite sides of the clip to prevent pushing of the clip into the ends of the sausage stick.

The piston rod 60 of the opposed gripper device 46 will be extended to shift the jaws 79 towards the adjacent end of the sausage stick S. Air under pressure will be introduced into the chamber 74 to move the free floating piston 68 forwardly to thereby cause the jaws 79 to be shifted to the open condition. When the open jaws engage the end portion of the sausage stick, air under pressure will be introduced into the chamber 92, thereby shifting the free floating piston in a retracted direction and causing the jaws 79 to be closed upon the clipped end. The piston rod 60 will be retracted, thereby gently pulling the clipped end outwardly away from the sausage stick in preparation for the final declipping. Air is again introduced into the chamber 74, thereby opening the jaws 79 and the piston rod 60 is retracted, as well as the piston rod 97, for the opposed pusher devices.

The endless conveyor belt 26 will be indexed by the indexing roller assembly 37 to the next station, which is identical to the first station. In this regard, the other pusher device of the first pair of pusher devices 48 will engage the same end of the sausage stick which was engaged by the first pusher device. Similarly, the other gripper device of the first pair of gripper devices will engage the same clip end of the sausage stick engaged by the first mentioned gripper device. This redundancy is provided to allow the apparatus to have two chances to properly position the clip ends of the casing to be disposed in an optimum condition for the final declipping operation. It will be appreciated that the clip MC at the end of the sausage stick may actually have been inadvertently imbedded in the end of the sausage stick so that the redundancy operation of pulling the clip end outwardly will decrease the likelihood that the clip end of the casing will not be in the optimum condition for the final clip removal operation.

After the redundancy pulling operation at station two, the sausage stick will be indexed to the third station by the endless belt 26, where the pusher device of the second pair of pusher devices will shift the sausage stick so that the other end thereof may be engaged by the gripper device of the second pair of gripper devices. The operation will be repeated at station four and the clip ends of the casing will be pulled outwardly in preparation for the declipping operation at station five.

Each sausage stick is next moved by the infeed indexing conveyor device 25 to the gate roller assembly 106. The computerized controller 262 is operable to actuate the front pair of pneumatic piston and cylinder units 127 so that the piston rods 129 thereof are retracted, which produces a pivoting type camming movement of the triangular side plates 111 of the gate roller assembly. The front roller is moved downwardly by this action. The hydraulic motor 180 operates continuously to drive the conveyor belt 170 so that the lower run of the conveyor belt engages the sausage stick to roll and drop into position between the two rollers. Thereafter, the piston rods 129 of the front pair of pneumatic piston and cylinder units are extended to thereby raise the front gate roller 107 to its original position, so that the sausage stick is centered therebetween. During elevating movement of the front gate roller 107, the retracted gripping and twisting devices 102 will be shifted inwardly by their respective piston rods with the jaws 103 thereof in an open condition.

At this point, each sausage stick S will be positioned between the gate rollers with the jaws of the gripping and twisting devices positioned around the clipped ends of the casing. The sausage stick will engage the actuators 246 before the front roller reaches its elevated position. The sausage stick will depress the actuators 246, actuating the control switch mechanisms 259, thereby causing the jaws 103 of the gripping and twisting devices to close on the ends of the casing, while simultaneously energizing the motor 126. The sausage stick will be rotated by the rollers until the clips MC are twisted from the casing C. The rotation of the gate rollers will continue through a predetermined number of rotations and, when motor 126 stops, the front roller 108 will drop as a result of the retraction of the piston rods 136 of the front pair of cylinder and piston units 134. The conveyor belt 170 of the outfeed and labeling conveyor device 150 will move the sausage stick from the gate roller assembly to the labeling section. Thereafter, the piston rods on the front pair of cylinder and piston units will extend, raising the front gate roller 108 to its original position. The jaws 103 of the gripping and twisting devices 102 will retract and open at their original retracted positions to drop the clip outside of the machine frame.

The conveyor belt 170 will thereafter move the sausage sticks S along the support plates 187 towards the flat discharge plate 208. In this regard, it is pointed out that the support plates 187 are inclined upwardly from the rear towards the discharge plate 208. The label support 217 is also inclined from the rear towards the front, so that conveyor belt 170 moves each sausage stick S in an uphill direction over the stack of labels L. Glue head assemblies will have applied glue to the unprinted surface of the uppermost label so that the label will roll upon the sausage stick as the latter is moved towards the discharge plate.

The side aligners 192 and 193 maintain the labels in the proper aligned conditions. The air ejected from the front pair of side label aligners 192 ripples the label to thereby enhance the separation of the labels as the uppermost label is applied to the sausage stick. In this regard, the glue head assemblies apply glue from the hot melt gluer 262 to the leading and trailing edges of the topmost label just prior to the product rolling over the label.

Figure 3:
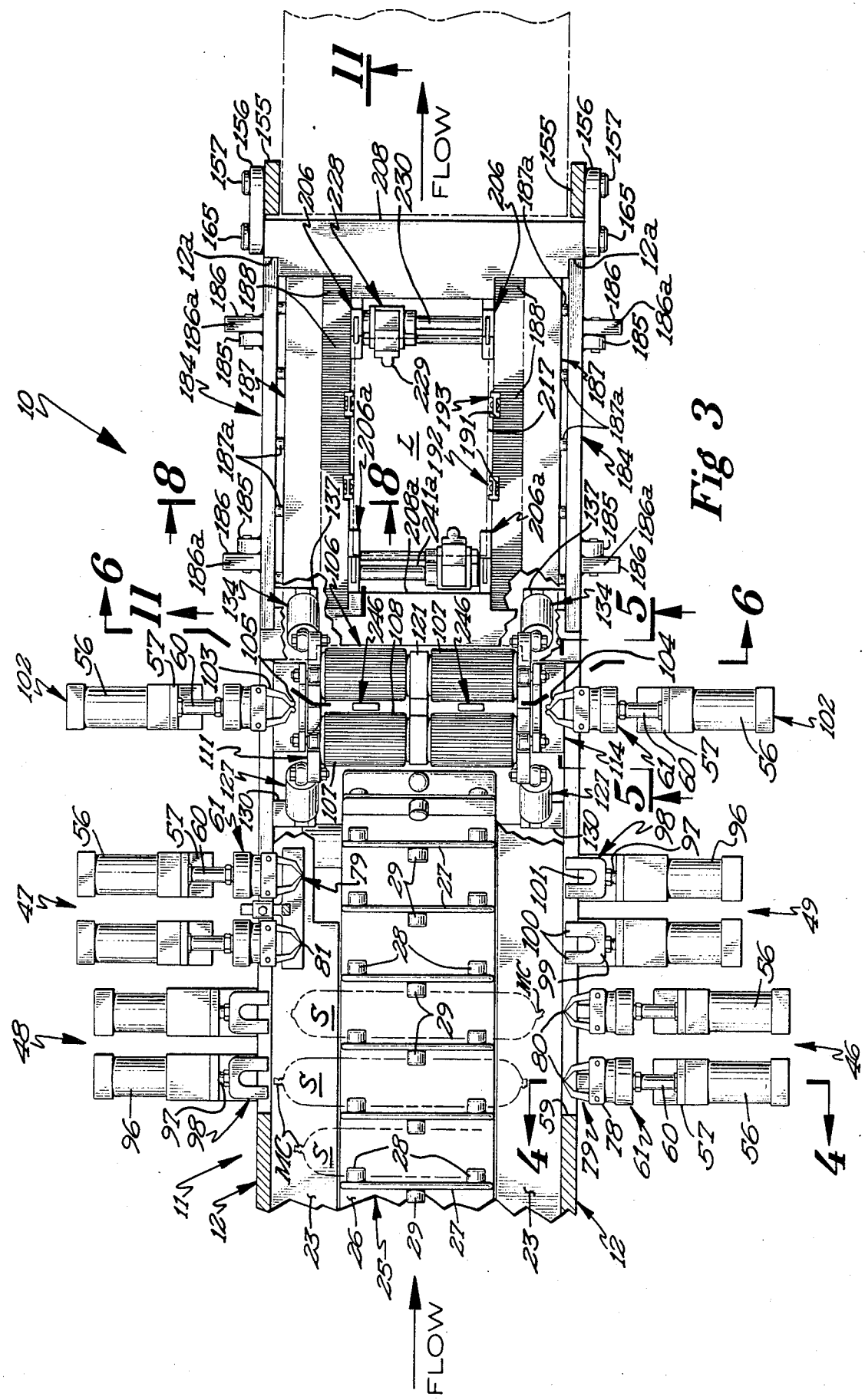
FIG. 3 is a top plan view taken along the cutting plane 3—3 of FIG. 2 and looking in the direction of the arrows.

It has been found that metal clips MC removed from labels through the twisting action twist the clips from the casing without producing frayed or torn ends, which is the characteristic result from manual clipping or shearing. The infeed indexing conveyor device is also capable of accommodating sausages of slightly varying diameters, since the opposed buttons 28 and 29 serve to effectively center the sausages as the sausage sticks are indexed through the various stations. It will also be pointed out that the flights or slats may yield slightly in response to oversized sausage sticks, as best seen in FIG. 3.

The present clip removing apparatus permits an operator to feed sausage sticks to the infeed indexing conveyor so that the clips can be removed from the sausage sticks and the labels applied thereto in a continuous manner prior to the packaging of the sausage sticks in a plastic wrap.

It will, therefore, be seen that I have provided a novel clip removing apparatus which is effective in removing clips from sausage sticks in a more efficient manner than any heretofore known comparable devices.

What is claimed is:

1. A continuous process for removing the clips from opposite ends of an elongate sausage stick and the casing and applying the label to the sausage stick, comprising:

sequentially moving sausage sticks to be declipped in a predetermined direction of travel, each sausage stick being disposed transversely of the direction of travel and, during said travel, moving each sausage stick to a clamping station, interrupting the travel of each sausage stick and mechanically gripping the clips on opposite ends of a sausage stick with a mechanical gripping medium, rotating the sausage stick to cause the clips clamped by the clamping medium to be twisted from the casing, and engaging each sausage stick with a rolling and pressure applying medium to cause each sausage stick to be rolled across an adhesive coated label to thereby cause the label to be progressively applied to the sausage stick.

2. A continuous process for removing clips from opposite ends of an elongate sausage stick encased in a casing and for applying a label to the sausage stick, comprising:

sequentially moving sausage sticks to be clipped in a predetermined path of travel, each sausage stick being disposed transversely of the direction of travel, during said travel, moving each sausage stick to a first gripping and positioning station, engaging one end of each sausage stick with a mechanical pushing medium to push each sausage stick laterally of the direction of travel, engaging the other end of each sausage stick with a gripping medium to pull the end portion of the casing and clip outwardly, continuing movement of the sausage stick to a second gripping and positioning station, interrupting movement of the sausage stick and engaging the other end of each sausage stick with a pushing medium to push the sausage stick laterally of the direction of travel and oppositely of the direction of the sausage stick engaged by the first pushing medium, engaging said one end of the sausage stick with a gripping medium to pull the end portion of the casing and clip outwardly, continuing movement of each sausage stick in the direction of travel and moving each sausage stick to a clamping station, interrupting the travel of each sausage stick and mechanically gripping the clips on opposite ends of each sausage stick with a mechanical gripping medium, rotating the sausage sticks to cause the clips clamped by the clamping medium to be twisted from the casing, moving each sausage stick to a labeling station, and engaging each sausage stick with a roller and pressure applying medium to cause each stick to be rolled across an adhesive coating label to thereby cause the label to be progressively applied to the sausage stick.

3. An apparatus for removing the clip from opposite ends of a casing of an elongate sausage stick in preparation for packaging the sausage stick, comprising:

a frame, feed means on said frame for supporting and causing sequential movement of the sausage stick in a predetermined path of travel, said sausage sticks being arranged in transverse relation to the path of travel, a pair of clamping mechanisms mounted on said frame in opposed relation from each other, each clamping mechanism being movable between open and closed positions and being extensible and retractible, gate means mounted on said frame for vertical shifting movement relative thereto and being positioned downstream of said feed means, means for vertically adjusting said gate means between a receiving position, a centering position, and a discharge position, said gate means, when vertically shifted to the receiving position, receiving a sausage stick from the feed means, and said gate means, when vertically adjusted to the centering position, aligning the ends of a sausage stick with said clamping mechanism, whereby when the latter are extended and closed, the clips on the sausage will be clamped, means for rotating said gate means when in the centering position to thereby rotate the sausage stick and cause each clip gripped by the clamping means to be twisted from the ends of the casing on the sausage stick, and said gate means, when vertically adjusted to the discharge position, permitting the declipped sausage stick to be discharged therefrom.

4. The apparatus as defined in claim 3 and a label support means on said frame located downstream of said gate means, said label support means having a plurality of labels vertically stacked thereon, means for sequentially applying an adhesive to the upper surface of each label, and means engaging each declipped sausage stick discharged from said gate means and being operable to roll each sausage stick over the adhesive coated surface of a label to cause the label to be applied to the sausage stick.

5. The apparatus as defined in claim 3 wherein said gate means includes a rear gate roller and a front gate roller, each being revolvably mounted in side-by-side relation on said frame, said rear gate roller being positioned adjacent said feed means, means for vertically adjusting each gate roller relative to the other, said rear gate roller being in a lowered position and said front gate roller being in a raised position when said rollers are in the receiving position, said rollers being in the raised position when in the centering position, and the rear gate roller being in a raised position and said front gate roller being in a lowered position when said rollers are in the discharge position.

6. The apparatus as defined in claim 3 wherein said feed means comprises an endless conveyor, a plurality of spaced apart transversely extending slats affixed to said conveyor and projecting therefrom, the spacing between adjacent slats accommodating a sausage stick therebetween whereby said sausage sticks will be moved sequentially by said conveyor in said path of travel.

7. The apparatus as defined in claim 6 wherein said slats of said feed means are formed of a somewhat yieldable material, each slat having a pair of sausage stick engaging elements affixed to one surface thereof and a single sausage stick engaging element affixed to the other surface thereof, each sausage stick having one surface portion thereof engaged by a pair of said engaging elements on one slat and having the other surface portion engaged by a single engaging element on the other slat.

8. The apparatus as defined in claim 3 and a plurality of gripping mechanisms mounted on said frame upstream of said pair of clamping mechanisms, one of said gripping mechanisms being on one side of said frame and the other gripping mechanism being mounted on the other side of said frame, each gripping mechanism being extensible and retractable and being shiftable between open and closed positions, said gripping mechanisms being operable to grip and pull the clipped ends outwardly and to then release the clipped ends to position the latter in an optimum position for clamping engagement by said clamping mechanisms.

9. The apparatus as defined in claim 8 wherein one of said gripping mechanisms is positioned downstream of the other gripping mechanisms, a pair of pusher mechanisms mounted on said frame, each of which is positioned in opposed relation with respect to one of said gripping mechanisms, each pusher mechanism being extensible and retractable, whereby, when each pusher mechanism is extended, it will engage an end of a sausage stick to push the latter towards the opposed gripping mechanism.

10. The apparatus as defined in claim 7 and an indexing drive mechanism operatively connected to said endless conveyor for driving the latter in an interrupted indexed mode with respect to each gripper mechanism and with respect to said clamping mechanism.

11. The apparatus as defined in claim 8 wherein each gripping mechanism includes a cylinder connected to a source of fluid under pressure, a piston rod extensible and retractable relative to said cylinder, a pair of jaws connected with said piston rod, and means for selectively opening and closing said jaws.

12. The apparatus as defined in claim 9 wherein each pusher mechanism includes a cylinder connected to a source of fluid under pressure, said cylinder having a piston rod extensible and retractable relative thereto, a U-shaped member affixed to the outer end of said piston rod and adapted to engage the end of a sausage stick on opposite sides of the clip when the pusher mechanism is extended to push the sausage stick towards the opposed gripping mechanism.

13. The apparatus as defined in claim 5 wherein said gate rollers of said gate means are revolvably mounted on a pair of mounting plates, a plurality of fluid pressure, cylinder and piston units connecting said mounting plates with said frame, said cylinder and piston units being selectively extensible and retractable to cause said mounting plates to be tilted and thereby selectively shift said rollers between receiving, centering, and discharge positions.

14. The apparatus as defined in claim 4 wherein said means for rolling each declipped sausage stick over an adhesive coated label comprises an endless conveyor belt mounted on said frame adjacent said gate means in overlying relation with each sausage stick discharged from the gate means.

15. The apparatus as defined in claim 13 and a control mechanism mounted on said gate means between said front and rear gate rollers, said control mechanism being actuated when engaged by a sausage stick to cause extension and shifting movement of the clamping to the closed position, and causing rotation and shifting movement of the gate rollers from the receiving position to the centering position and thereafter to the discharge position.

16. The apparatus as defined in claim 3 wherein each of said clamping mechanisms includes a cylinder connected to a source of fluid under pressure, a piston rod in said cylinder and being extensible and retractable relative thereto, a pair of jaws swingably connected with said piston rod, and means for shifting said jaws between open and closed positions.

* * * * *